United States Patent [19]
Shibata

[11] Patent Number: 5,724,108
[45] Date of Patent: Mar. 3, 1998

[54] LIQUID CRYSTAL DISPLAY DEVICE WITH A PRISM SHEET THAT INCREASES BRIGHTNESS IN THE OPTIMUM RANGE OF VIEWING ANGLE

[75] Inventor: Katsuhiko Shibata, Mobara, Japan

[73] Assignee: Hitachi, Ltd., Tokyo, Japan

[21] Appl. No.: 759,839

[22] Filed: Dec. 2, 1996

Related U.S. Application Data

[63] Continuation of Ser. No. 400,843, Mar. 8, 1995, abandoned.

[30] Foreign Application Priority Data

Mar. 14, 1994 [JP] Japan .................. 6-042111

[51] Int. Cl.$^6$ .................. G02F 1/1335
[52] U.S. Cl. .................. 349/62; 362/339
[58] Field of Search .................. 359/40, 41, 69; 362/27, 339; 349/57, 62, 65

[56] References Cited

U.S. PATENT DOCUMENTS

| | | | |
|---|---|---|---|
| 5,408,344 | 4/1995 | Takiguchi et al. | 359/40 |
| 5,414,599 | 5/1995 | Kaneko et al. | 362/339 |
| 5,467,417 | 11/1995 | Nakamura et al. | 385/36 |

FOREIGN PATENT DOCUMENTS

| | | | |
|---|---|---|---|
| 63-232421 | 10/1986 | Japan . | |
| 62-8129 | 1/1987 | Japan . | |
| 2-15 | 1/1990 | Japan | 359/40 |
| 6-148433 | 5/1994 | Japan . | |

Primary Examiner—William L. Sikes
Assistant Examiner—Charles Miller
Attorney, Agent, or Firm—Antonelli, Terry, Stout, Kraus, LLP

[57] ABSTRACT

Between the liquid crystal display panel and the backlight is arranged a prism sheet whose upper surface forms a prism surface and lower surface forms a smooth surface. The cross section of the prism surface is scalene triangles. Each of the scalene triangles is so shaped that if its base angles are taken to be $\theta 1$ and $\theta 2$, the relationship of 25 degrees$\leq \theta 1 < 45$ degrees and 45 degrees$\leq \theta 2 < 90$ degrees hold and that the prism surface on the base angle $\theta 1$ side faces in the direction of a wider viewing angle characteristic of the liquid crystal display panel. In this construction, because the emitted light can be converged in an optimum range of viewing angle of the liquid crystal display panel, it is possible to increase the brightness of the backlight with the same power consumption as used in the conventional apparatus and to reduce power consumption of the backlight.

20 Claims, 12 Drawing Sheets

LIQUID CRYSTAL DISPLAY DEVICE WITH A PRISM SHEET THAT INCREASES BRIGHTNESS IN THE OPTIMUM RANGE OF VIEWING ANGLE

This application is a continuation of Ser. No. 08/400,843, filed Mar. 8, 1995, now abandoned.

CROSS-REFERENCE TO RELATED APPLICATION

This application is related to copending, commonly assigned, U.S. application Ser. No. 08/117,789, filed Sep. 8, 1993, now U.S. Pat. No. 5,467,417.

BACKGROUND OF THE INVENTION

The present invention relates to a liquid crystal display device which has installed between a liquid crystal display panel (liquid crystal display element) and a backlight, a prism sheet that restricts rays of light emitted from a backlight over a wide range of angles to a specified range of angles to increase the brightness of the optimum range of viewing angle.

DESCRIPTION OF THE PRIOR ART

With society becoming increasingly information-oriented, there are growing needs for making small and portable information processing equipment such as personal computers, word processors and workstations. Performances required of such portable information processing equipment include small size, light weight and small power consumption for allowing long hours of use with small-capacity batteries. Because the display device incorporated into the information processing equipment, in particular, largely determines the shape, dimension and weight of the equipment and because the display device is kept continuously turned on while the information processing equipment is in use, the display device should preferably be thin in thickness and consume as small power as possible.

Among such display devices is a liquid crystal display device disclosed in Japan Patent Laid-Open No. 67016/1992.

This liquid crystal display device has a backlight under the liquid crystal display panel and a prism sheet between the liquid crystal display panel and the backlight. Rays of light emitted from the backlight are scattered by a scatter plate and pass through the prism sheet to enter the liquid crystal display panel. The prism sheet has a smooth surface at its underside and a prism surface on its upper side. The prism surface is formed with a plurality of parallelly arranged isosceles triangle prisms with a vertex angle of 90 degrees in cross section. This prism sheet converges rays of light scattered by the scatter plate over a wide range of angle toward the direction normal to the prism sheet, thereby increasing the brightness of the display in an optimum range of viewing angle. This in turn reduces power consumption of the backlight.

FIG. 14 is an enlarged cross section of the conventional prism sheet. Reference numeral 1 represents a prism sheet, 11 a prism surface formed on the upper side of the prism sheet 1, 1a and 1b first and second prism surface, 1c a smooth surface on the underside of the prism sheet 1, θ a vertex angle of an isosceles triangle, θ1 and θ2 base angles of this isosceles triangle, and L an example trace of light emitted from a backlight (not shown; see FIG. 1). Here, the vertex angle θ is 90 degrees and the base angles θ1, θ2 are 45 degrees respectively.

FIG. 15 shows a viewing angle-light intensity characteristic of light emitted from the conventional backlight (relation between viewing angle and brightness). A dashed line 90 represents a case where the prism sheet is not used. A solid line 91 represents a case where the backlight uses the prism sheet 1 shown in FIG. 14 with the vertex angle of 90 degrees (the cross section of the prism surface is an isosceles triangle and a half vertex angle is 45 degrees). A one-dot line 92 represents a viewing angle characteristic of the backlight that uses a prism sheet whose vertex angle is 130 degrees (the cross section of the prism surface is an isosceles triangle and a half vertex angle is 65 degrees). In a case where a polycarbonate prism sheet is used, a light tracking calculation according to the Snell laws of refraction was performed with the refractive index taken to be 1.585. The result of light tracking calculation as indicated by the solid line 91 agrees well with the measured value of the brightness improvement factor of the prism sheet 1 shown in FIG. 14. When the prism sheet 1 of FIG. 14 is installed between the liquid crystal display panel and the backlight, the brightness in the effective viewing angle range from −35 degrees to +35 degrees increases by more than 1.4 times. Comparison between the solid line 91 and the one-dot line 92 clearly shows that as the vertex angle of the isosceles triangle of the prism sheet is increased, the viewing angle range expands but the brightness improvement factor decreases. That is, when the results of the light tracking calculation for the prism sheets with the vertex angles of 90 degrees and 130 degrees are compared, the latter prism sheet has a wider viewing angle range by about 25 degrees but a slightly reduced brightness. Further, comparison of the viewing angle range evaluation results of the prism sheets with vertex angles of 90 degrees and 100 degrees finds that the prism sheet with the 100-degree vertex angle has a viewing angle range about 6 degrees wider, which agrees well with the result of light tracking calculation.

FIG. 2 shows a grey scale dependency on viewing angle (relation between viewing angle and brightness) of a liquid crystal display panel of active matrix type using thin-film transistors as switching elements (hereinafter abbreviated a TFT-LCD). Solid lines 21–28 represent shades 1–8. The shade 1 signifies white in the case of black-and-white display and, in the case of color display, indicates primary colors—red, blue and green. As the brightness lowers from shade 1 down to shade 8, the luminance in the case of black-and-white display decreases and, in the case of color display, the chrominance decreases.

In FIG. 2, the viewing angle of 0 degree represents a direction normal to the display screen. As the viewing angle is changed toward the plus direction (upward), the shade 1 represented by solid line 21 and the shade 2 represented by solid line 22 cross at a viewing angle of a few more than 20 degrees. At this crossing point there is no difference between shade 1 and shade 2, and at greater viewing angles the order of luminance or chrominance of shade 1 and shade 2 reverses. In other words, the viewing angle range in the plus direction can be said to be a few more than 20 degrees. In the minus direction (downward), the shade 7 represented by solid line 27 and the shade 8 represented by solid line 28 cross at about minus 10 degrees. In the viewing angle range in the minus direction beyond this angle, the order of luminance for shades 8–3 reverses. Hence, the viewing angle in the minus direction can be said to be about 10 degrees. It follows therefore that the viewing angle characteristic of the gray scale of the TFT-LCD shown in FIG. 2 has a range from −10 degree to +20–30 degrees, with a wider range on the plus (upward) side.

The viewing angle characteristic of light intensity of the backlight that uses or does not use a conventional prism sheet is symmetrical vertically and laterally with respect to the normal direction, as shown in FIG. 15. Therefore, the viewing angle characteristic of the light intensity of the backlight and the viewing angle characteristic of the liquid crystal display panel do not coincide, with the result that the power consumption of the backlight is not optimumly utilized.

The reason that the viewing angle characteristic in the liquid crystal display panel of active matrix type or simple matrix type is not vertically symmetrical is that the columnar molecules of liquid crystal material of specified lengths interposed between two transparent glass substrates are already tilted at a specified angle to the transparent glass substrate surface before they are twisted, so that the rate of change of refractive index varies according to the viewing angle of the liquid crystal display panel, causing differences in the ease with which light rays are refracted, i.e., in the contrast.

Apparatuses associated with this invention include a light scattering device disclosed in Japan Patent Laid-Open No. 146401/1992. This conventional technique arranges a prism sheet, whose prism surface is isosceles triangles in cross section, on the scatter plate (it is stated that the preferred vertex angle is from 60 degrees to 180 degrees). Thus, the light coming out of the prism surface provides the maximum luminance in the normal direction and is diffused symmetrically about the normal direction. With the present invention, on the other hand, the prism surface is made of scalene triangles in cross section to deviate the center of the light emitting direction from the normal direction according to the viewing angle characteristic of the liquid crystals. This increases the brightness in the optimum direction of the liquid crystals, viewing characteristic.

Japan Patent Laid-Open No. 84618/1990 describes a planar light source unit having a prism sheet with its prism surface on the backlight side (light conduction plate side). In this conventional technique, the light coming out of the light conduction plate provides a peak luminance in the viewing angle range at both plus 80 degrees and minus 80 degrees with the normal direction taken to be zero degree. The direction of light is changed by the prism sheet. In the present invention, on the other hand, the light coming out of the scatter plate provides a peak luminance in the normal direction, with the luminance gradually decreasing symmetrically away from the normal direction. The direction of this light is changed by the prism sheet.

Further, Japan Patent Laid-Open No. 200930/1991 describes a liquid crystal display device, whose light source uses a backlight directly beneath a multiprism sheet. The prism surface is on the backlight side. With this type of backlight, a part of the display where there is a fluorescent lamp becomes too bright, causing variations in luminance. To deal with this problem, a dark area removing sheet is arranged between the liquid crystal display panel and the multiprism sheet. Luminance variations can be reduced by increasing the distance from the scatter plate to the light source. In other words, a light curtain is added to reduce luminance variations that are caused by the reduced thickness of backlight. This, however, lowers the luminance level of the bright area to match that of the dark area, so that the efficiency become worse. This conventional technique is characterized in that a directly-under-LCD-panel type backlight and a multiprism sheet are combined to make the backlight thin and improve efficiency.

In another conventional technique disclosed in Japan Patent Laid-Open No. 84618/1990 and 200930/1991, the prism pitch in the prism sheet is 0.38 mm and optical interference between the video signal lines and scan signal lines of TFT-LCD results in moire fringes. In the present invention, on the other hand, the prism pitch is 50 μm. Increasing the distance between the TFT-LCD and the prism sheet makes the moire fringes less noticeable. At a time when this conventional art was used, no technique was available for making prism sheets with a prism pitch of several tens of micrometers, so that to minimize the moire fringes, the prism surface of the prism sheet is considered to have been placed on the light conduction plate side. This conventional art does not make any reference to a suitable base angle of each prism.

SUMMARY OF THE INVENTION

The object of this invention is to provide a liquid crystal display device, which prevents emission of light in an ineffective range of viewing angle and increases intensity of light radiated in an effective range of viewing angles and which is thin, has small power consumption and is suited for incorporation into thin, portable information processing apparatuses with small power consumption.

To achieve the above objective, the liquid crystal display device of this invention is characterized in that an optical means is installed between the liquid crystal display panel and the backlight to control the direction of light emitted from the backlight to a specified range of angles, and that the viewing angle characteristic of the backlight is made to coincide with that of the liquid crystal display panel through the optical means.

The liquid crystal display device of this invention is characterized in that an optical means is installed between the liquid crystal display panel and the backlight to control the direction of light emitted from the backlight to a specified range of angles, that the optical means is a prism sheet whose upper surface forms a prism surface and lower surface forms a smooth surface, that the cross section of the prism surface is scalene triangles, and that the viewing angle characteristic of the backlight is made to coincide with that of the liquid crystal display panel by the shape of the scalene triangles.

The liquid crystal display device of this invention is characterized in that an optical means is installed between the liquid crystal display panel and the backlight to control the direction of light emitted from the backlight to a specified range of angles, that the optical means is a prism sheet whose upper surface forms a prism surface and lower surface forms a smooth surface, that the cross section of the prism surface is scalene triangles, and that the prism surface on a smaller base angle side (on a greater half vertex angle side) faces in a direction of a wider viewing angle characteristic of the liquid crystal display panel.

Further, the liquid crystal display device of this invention is characterized in that an optical means is installed between the liquid crystal display panel and the backlight to control the direction of light emitted from the backlight to a specified range of angles, that the optical means is a prism sheet whose upper surface forms a prism surface and lower surface forms a smooth surface, that the cross section of the prism surface is scalene triangles, and that if the base angles of the scalene triangle are represented by $\theta1$ and $\theta2$, then the relations of $25$ degrees $\leq \theta1 < 45$ degrees and $45$ degrees $\leq \theta2 < 90$ degrees hold and the prism surface on the base angle $\theta1$ side faces in a direction of a wider viewing angle characteristic (i.e., a wider viewing angle range) of the liquid crystal display panel.

The foregoing and other objects, advantages, manner of operation and novel features of the present invention will be understood from the following detailed description when read in connection with the accompanying drawings.

DESCRIPTION OF THE PREFERRED EMBODIMENTS

Prior to description of the preferred embodiment of the present invention, a basic concept of the role of a prism sheet according to the present invention will be described.

The viewing angle characteristic of the light intensity of the backlight depends on a half vertex angle of a triangle, a cross section of the prism surface, with respect to the normal line direction of the prism surface of the prism sheet. The greater the half vertex angle, the wider the viewing angle range. Let the half vertex angle be x. Then the base angle y is expressed by $$x = 90° - y \tag{1}$$

As the base angle y is increased, the half vertex angle x becomes small narrowing the viewing angle range. On the other hand, reducing the base angle y increases the half vertex angle x and widens the viewing angle characteristic. By aligning the prism surface on a smaller base angle $\theta 1$ side to the direction of wider viewing angle characteristic of the liquid crystal display panel, it is possible to utilize the light emitted from the backlight more effectively, reducing power consumption of the backlight.

The half vertex angle of a triangle in the cross section of the prism surface is suitably set at 45 to 65 degrees considering the viewing angle characteristic and the brightness improvement factor. In this case, the viewing angle range is more than 35 degrees with respect to the normal line direction and the brightness improvement factor is around 1.4 times. From Equation (1), the base angle $\theta 1$ is 25 degrees $\leq \theta 1 < 45$ degrees. The prism surface having the other base angle $\theta 2$ provides a narrower viewing angle characteristic. The base angle $\theta 2$ is preferably set in the range of 45 degrees $\leq \theta 2 < 90$ degrees so as not to block light emitted from the adjacent prism surface having the base angle $\theta 1$.

With the above configuration, the emitted light can be converged in the optimum viewing angle range of the liquid crystal display panel by aligning the viewing angle characteristic of the brightness of the backlight with the viewing angle characteristic of the liquid crystal display panel. Thus, at the same power consumption, this invention can increase the brightness in the optimum range of viewing angle. In other words, the power consumption of the backlight can be reduced.

Figure 3:
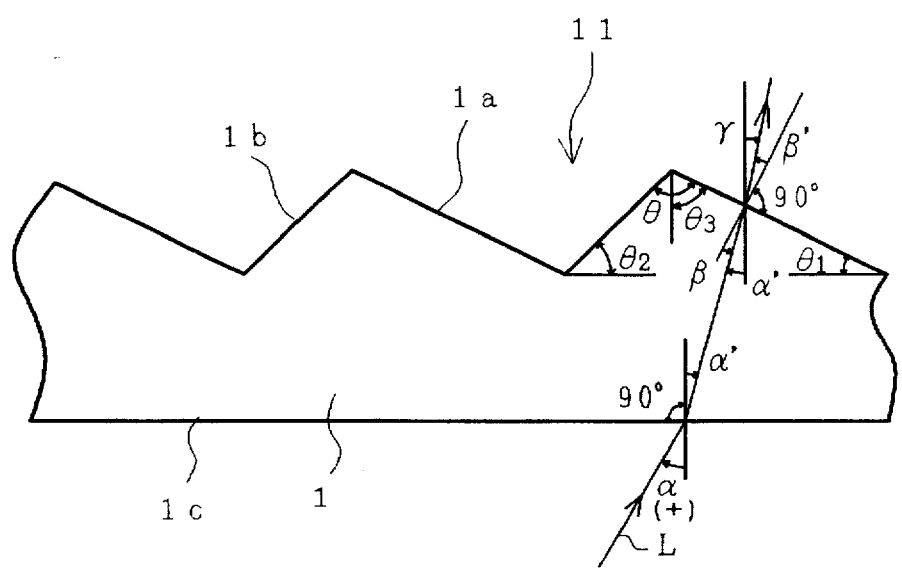
FIG. 3 is a cross section showing an essential portion of the prism sheet of the first embodiment of this invention.

Now, the liquid crystal display device of this invention is described by referring to FIG. 3. FIG. 3 is a cross section of an essential portion of the prism sheet of the first embodiment. Reference numeral 1 represents a prism sheet; 11 a prism surface formed on the upper side of the prism sheet 1; 1a and 1b first and second prism surfaces; 1c a smooth surface on the underside of the prism sheet 1; $\theta$ a vertex angle of a scalene triangle; $\theta 1$ and $\theta 2$ base angles of the scalene triangle; $\theta 3$ a half vertex angle on the base angle $\theta 1$ side; and L an example trace of light emitted from the backlight.

From the Snell laws of refraction, the locus of light emitted from the prism surface can be expressed as follows, with an exit angle with respect to the normal line direction taken to be $\gamma$.

Herein, $\alpha$ in FIG. 3 is an incident angle to a prism sheet with a cross section of scalene triangles as an optical means, and is defined as a positive (+) value when a trace L of a ray of an incident light, is directed toward a side 1a adjacent a smaller side base angle $\theta 1$.

$$\alpha' = \arcsin(1/n \times \sin \alpha)$$

$$\theta 3 + \alpha' - \beta = \pi/2, \text{ or } \beta = \theta 3 + \alpha' - \pi/2$$

The ray of light that meets $n \times \sin \beta < -1$ is totally reflected by the prism surface 1a and enters the prism surface 1b. If we let the incidence angle on the prism surface 1b be $\delta$ and when the condition $n \times \sin \delta < -1$ holds, the light that struck the prism surface 1b is totally reflected and goes out from the smooth surface 1c of the prism sheet 1. The light is then scattered by the scatter plate to enter the prism sheet 1 again.

The exit angle $\beta'$, at the prism surface 1a can be expressed as $\beta' = \arcsin(n \times \sin \beta)$. Let $\gamma$ stand for the exit angle of light with respect to the normal line direction. $\gamma$ can be expressed as follows.

$\gamma = \pi/2 - \theta_3 + \beta'$

As shown by the light tracking calculation based on the Snell laws of refraction, if $\theta_3$ is set larger, $\gamma$ also increases.

If, for instance, $\theta_1$ is set at 25 degrees and $\theta_2$ at 45 degrees, the range of viewing angle is about 50 degrees on the $\theta_1$ side and about 35 degrees on the $\theta_2$ side. Further, of all rays of light incident on the prism sheet 1, the percentage of those rays striking the prism surface $1a$ on the $\theta_1$ side increases, so that the brightness on the prism surface $1a$ side is enhanced. At the prism surface $1b$ on the $\theta_2$ side, on the other hand, the half vertex angle becomes small so that light is converged toward the front direction, increasing the brightness.

Figure 5:
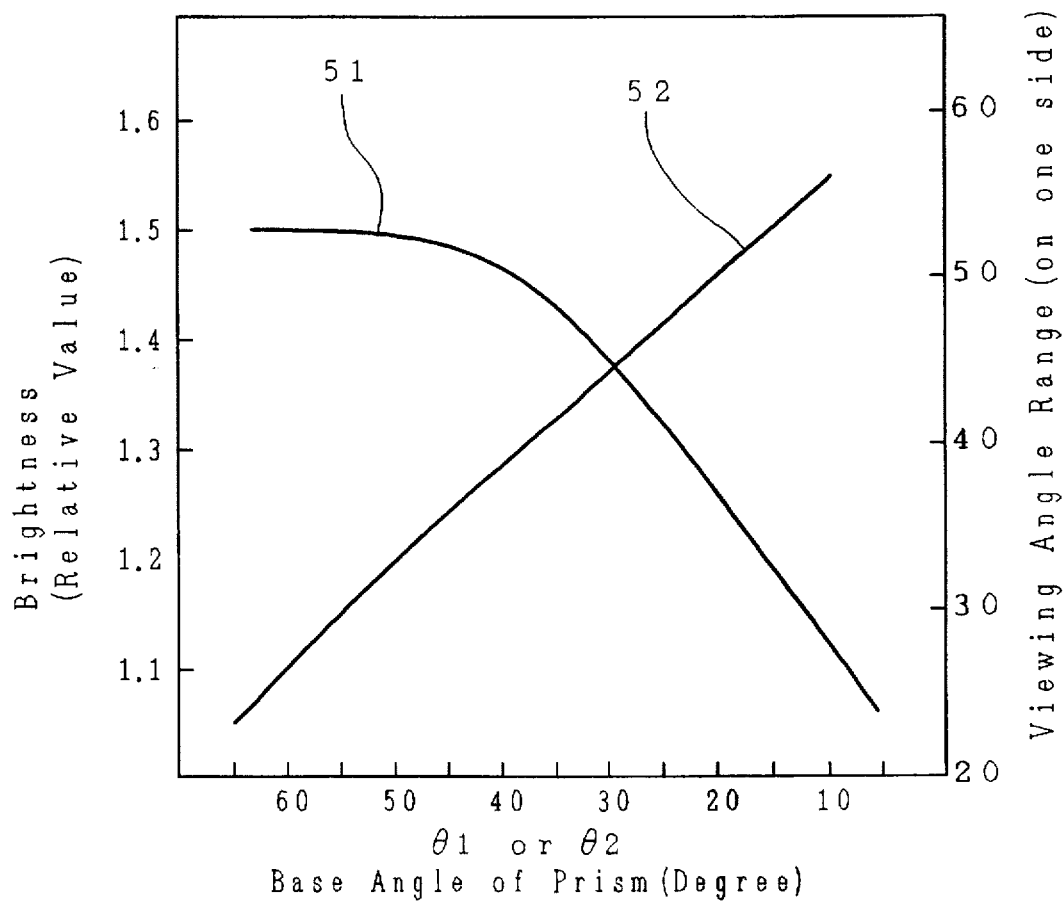
FIG. 5 is a graph showing the relation between the base angles of isosceles triangles that form the prism surface cross section of the backlight and the brightness improvement factor of the liquid crystal display panel.

FIG. 5 shows the brightness improvement factor and viewing angle range characteristic when the base angles ($\theta_1$ and $\theta_2$) are varied.

The brightness improvement factor represents a relative level of brightness in the direction of normal line with respect to the brightness measured when no prism sheet is used. The viewing angle range represents a viewing angle with respect to the normal line direction at which the brightness falls to 50%. The viewing angle range in FIG. 5 indicates a viewing angle range on one side of the normal line direction.

The solid line 51 represents the brightness improvement factor when the base angle is changed and the solid line 52 represents the viewing angle range when the base angle is changed.

As indicated by the solid line 51, the brightness improvement factor is almost saturated at the base angle of 45 degrees (the prism half vertex angle is 45 degrees). At the base angle of 20 degrees (the prism half vertex angle is 70 degrees), the brightness improves only about 20%. The improvement of about 20% can be obtained by inexpensive scatter sheet, which is made by embossing a thin sheet of, say, polycarbonate. Thus, to realize more than 30% improvement, the base angle should preferably be set at greater than 25 degrees.

From the solid line 52, it is seen that the base angle must be smaller than 50 degrees to obtain a viewing angle range of more than 30 degrees with TFT-LCD. For the base angle of more than 45 degrees, the brightness shows almost no improvement. Considering the requirement that the viewing angle range should be set as large as possible, the base angle should preferably be set smaller than 45 degrees.

From the above, it is preferred that the base angle be set in the range between 25 and 45 degrees.

Further objects and features of this invention will become apparent from the following description taken in conjunction with the accompanying drawings.

<<Liquid Crystal Display Panel, Backlight and Prism Sheet>>

Figure 1:
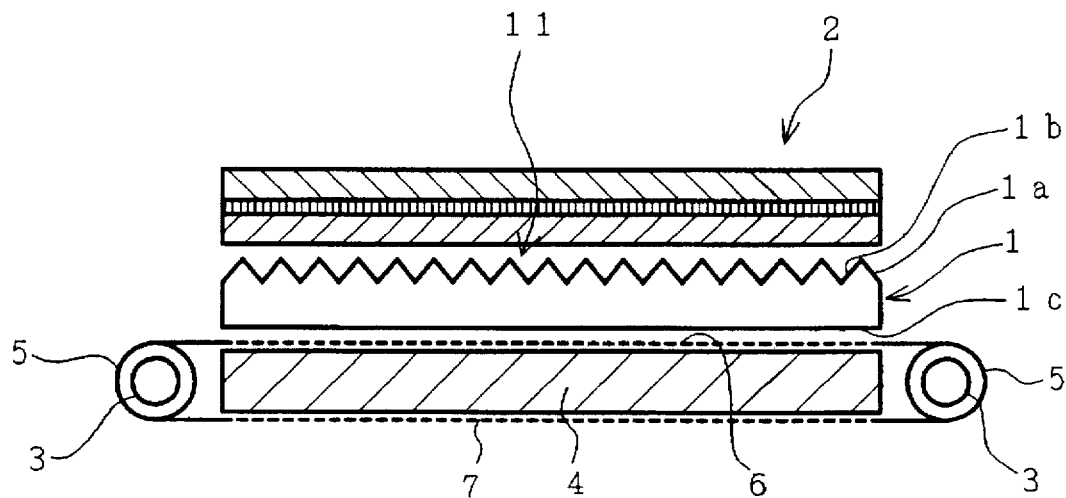
FIG. 1(a) is a schematic cross section showing a liquid crystal display panel, a backlight and a prism sheet of the liquid crystal display device as one embodiment of this invention.
FIG. 1(b) is an exploded perspective view of FIG. 1(a)
Figure 1:
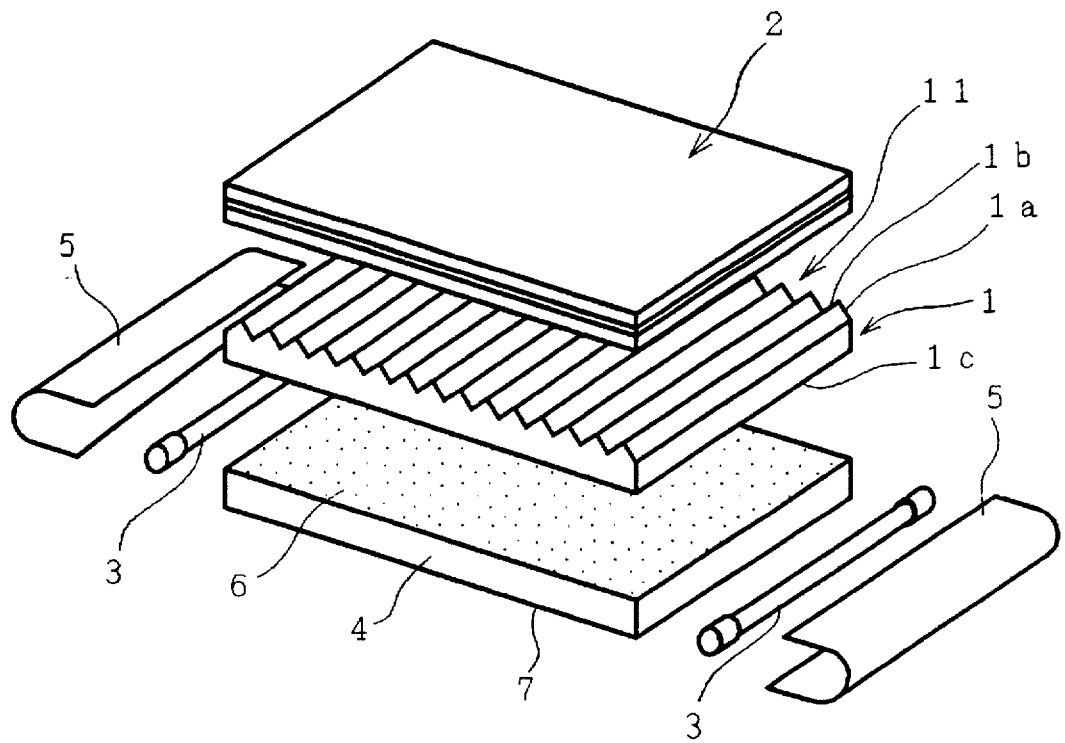

FIG. 1(a) is a schematic cross section showing the liquid crystal display panel, the backlight and the prism sheet of the liquid crystal display device as one embodiment of this invention. FIG. 1(b) is an exploded perspective view of FIG. 1(a).

Designated 2 is a liquid crystal display panel; 3 a fluorescent lamp as the backlight; 4 a light conduction plate made from acrylic resin; 5 a reflection sheet to reflect light from the fluorescent lamp 3 toward the light conduction plate 4; 6 a scatter plate (formed with minute bulges and dents on its surface) to scatter light emitted from the light conduction plate 4; 7 a reflection portion to return light emitted from the light conduction plate 4 toward it (formed, for example, of a white paint layer); 1 a prism sheet installed between the liquid crystal display panel 2 and the scatter plate 6 of the backlight; 11 a prism surface of the prism sheet 1; $1a$ and $1b$ first and second prism surfaces $1a$, $1b$; and $1c$ a smooth surface $1c$ of the prism sheet 1. The prism sheet 1 is made from a polycarbonate material or acrylic material with the refractive index of about 1.5 to 1.6.

Light emitted from the fluorescent lamp 3 either directly, or after being reflected by the reflection sheet 5, enters the sides of the light conduction plate 4, in which it is reflected by the reflection portion 7 at the underside of the light conduction plate 4 and exits from the upper side of the light conduction plate 4. The light coming out of the light conduction plate 4 is distributed by the scatter plate 6 so that the light coming out of the scatter plate provides a peak luminance in the normal direction with the luminance gradually decreasing symmetrically away from the normal direction, and then enters the prism sheet 1. The prism sheet 1 radiates light in directions only within an optimum viewing range, displaying information through the liquid crystal display panel 2.

The prism sheet 1 according to this invention is described in more detail by referring to FIG. 3, an enlarged cross section of the prism sheet.

The prism sheet 1 may be formed of, say, polycarbonate resin with the refractive index of 1.585 for instance. The cross section of the prism surface of the prism sheet 1 is scalene triangles. If we let the base angles of this scalene triangle be $\theta_1$ and $\theta_2$, then 25 degrees $\leq \theta_1 < 45$ degrees and 45 degrees $\leq \theta_2 < 90$ degrees. In the case of FIG. 3, $\theta_1$ is 25 degrees and $\theta_2$ 45 degrees, so that the half vertex angles are 65 degrees ($\theta_3$) and 45 degrees, respectively. The pitch of prisms of the prism sheet 1 is set at 50 µm, for instance, to prevent formation of moire fringes (interference fringes) caused by light interferences among the scan signal line and video signal line-both formed on the surface of one of the transparent glass substrates of the liquid crystal display panel 2 (TFT-LCD)—and the prism of the prism sheet 1. If the moire fringe is dealt with by inserting another scatter plate between the prism sheet 1 and the liquid crystal display panel 2 or by extending the distance between the liquid crystal display panel 2 and the prism sheet 1, a coarse pitch of about 0.3 mm may be used.

Figure 4:
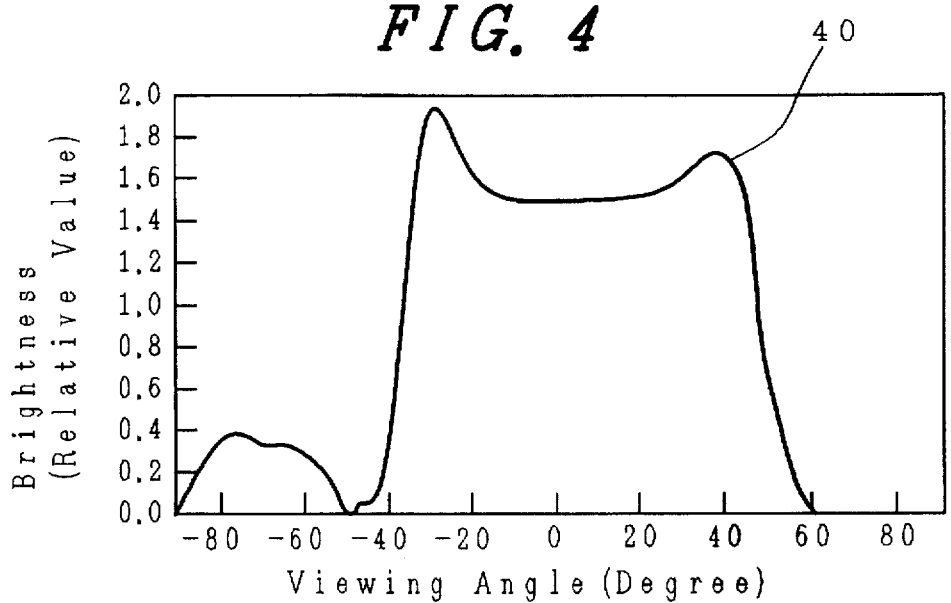
FIG. 4 is a graph showing an example viewing angle characteristic of the intensity of light emitted from the backlight with a prism sheet of this invention (relation between viewing angle and brightness)

FIG. 4 shows an example of viewing angle characteristic of the intensity of light coming out of the backlight which has a prism sheet of this invention.

Figure 2:
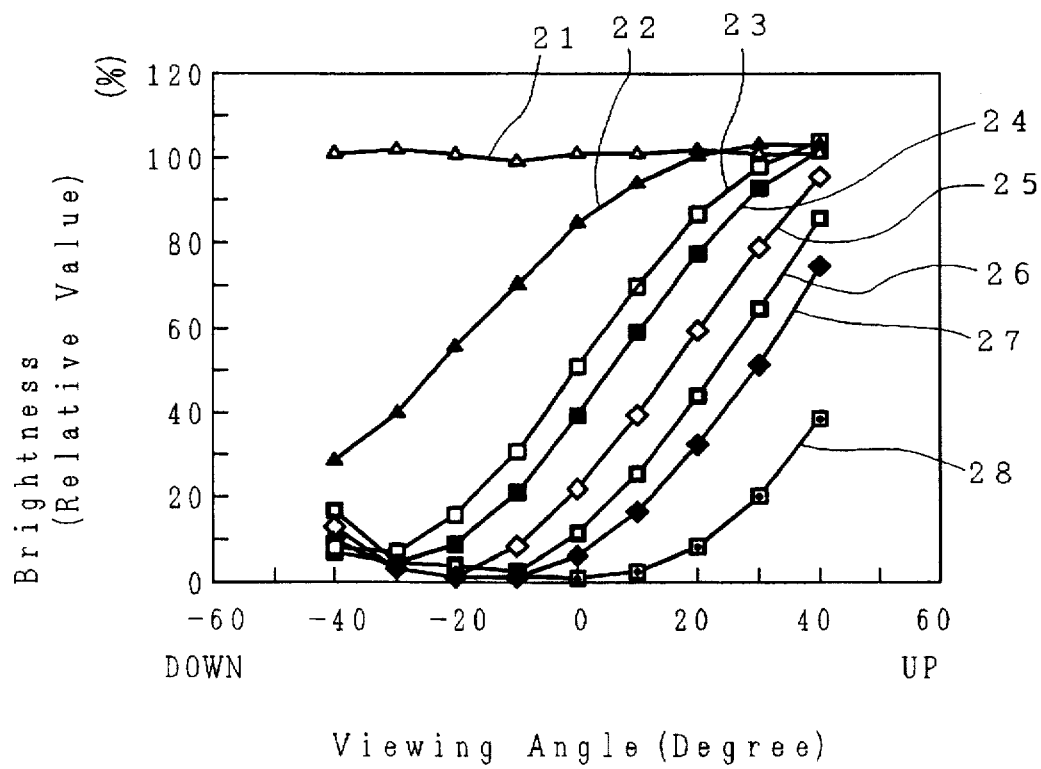
FIG. 2 is a graph showing a viewing angle dependency of grey scale (relation between viewing angle and brightness) in the liquid crystal display panel of active matrix type.

A solid line 40 represents a viewing angle characteristic of the prism sheet 1 of FIG. 3, as determined by the light tracking calculation. On the prism surface $1a$ side with the half vertex angle $\theta_3$ of 65 degrees and the base angle $\theta_1$ of 25 degrees, the viewing angle range is about 50 degrees. On the prism surface $1b$ side with the half vertex angle of 45 degrees and the base angle $\theta_2$ of 45 degrees, the viewing angle range is about 35 degrees. The viewing angle characteristic of the prism sheet 1 is made to agree with that of the TFT-LCD. That is, as explained by referring to FIG. 2, in the TFT-LCD the viewing angle range in the plus direction (upward) is a few more than 20 degrees and the viewing angle range in the minus direction (downward) is about 10 degrees. In other words, the viewing angle characteristic of the halftone of the TFT-LCD ranges from minus 10 degrees to plus 20–30 degrees. The viewing angle range is wider on the plus side (upward). Therefore, the prism surface $1a$ on the base angle $\theta_1$ side faces in a direction of a wider viewing angle range of the TFT-LCD. Furthermore, the conventional prism sheet whose cross section is isosceles triangles with the half vertex angle of 65 degrees has the viewing angle range of plus and minus 50 degrees. With this invention, however, the prism sheet 1 of FIG. 3 has a narrower viewing angle range of from plus 50 degrees to minus 35 degrees, which means that light is converged more increasing the overall brightness.

In this embodiment, by changing the half vertex angles of the left and right prism surfaces 1a, 1b and the base angles θ1, θ2, the viewing angle characteristic of the brightness of the backlight is made to correspond to that of the TFT-LCD to converge light toward a direction compatible with the viewing angle characteristic of the TFT-LCD (in an optimum range of viewing angle of TFT-LCD), thereby increasing the intensity of light radiated in directions within the optimum viewing angle range. Therefore, with the same power consumption, it is possible to realize an increased brightness level of the backlight. At the same luminance level, it is possible to reduce the power consumption. This in turn realizes a liquid crystal display device having a backlight with high luminance, low power consumption and long life. Such a liquid crystal display device is very suited to portable information processing apparatuses.

An embodiment of a liquid crystal display device of active matrix type to which the present invention is applied will be explained in the following.

<<Active Matrix Liquid Crystal Display Device>>

Now, an embodiment of this invention as applied to a color liquid crystal display device of active matrix type is described. In the following figures, parts having the same function are assigned like reference numerals and their explanations are omitted.

<<Overall Configuration of Liquid Crystal Display Module>>

Figure 6:
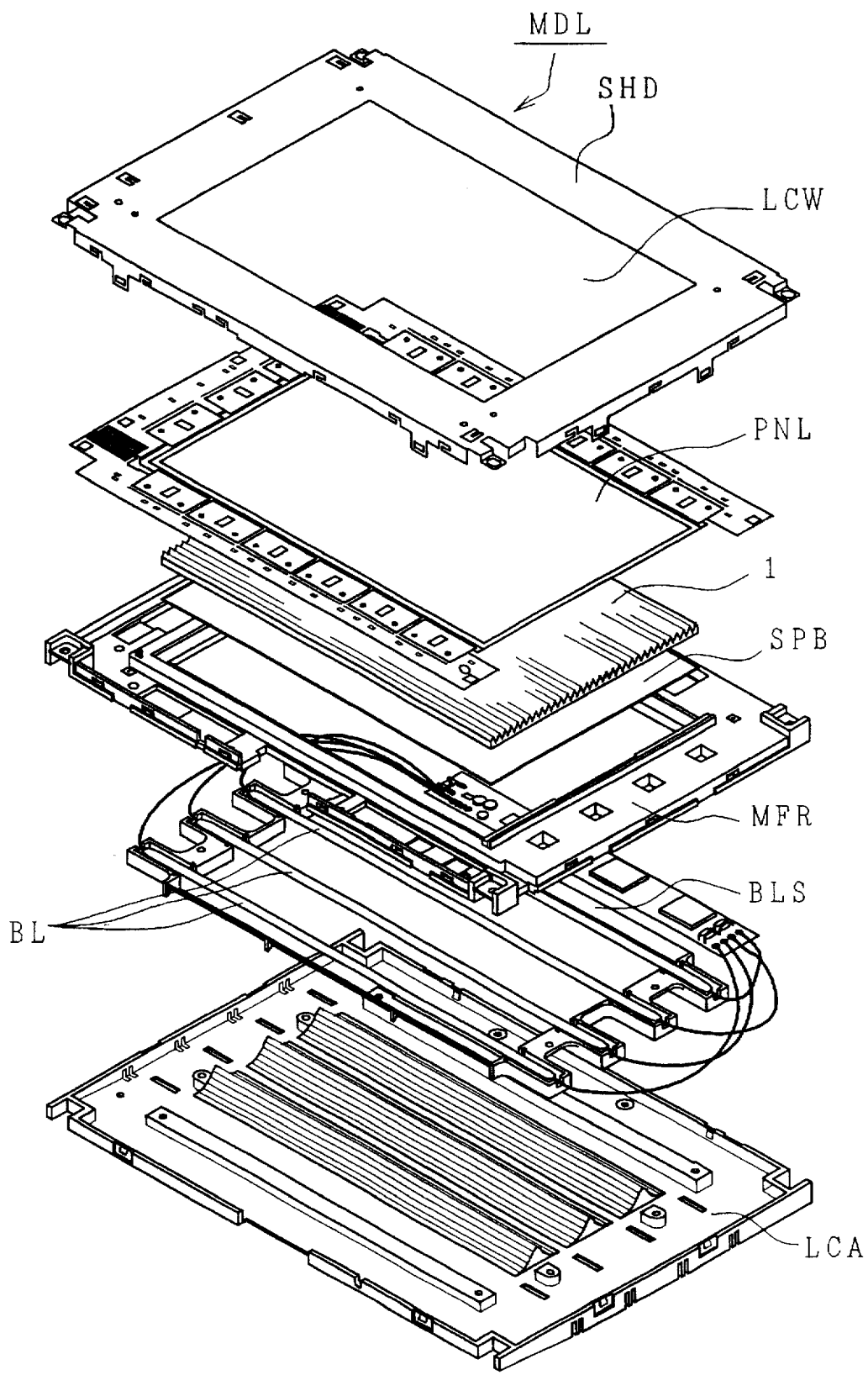
FIG. 6 is an exploded perspective view of a liquid crystal display module of active matrix type that applies the present invention.

FIG. 6 is an exploded perspective view showing constitutional components of a liquid crystal display module MDL.

Designated SHD is a shield case (metal frame), LCW a display window of the shield case, PNL a liquid crystal display panel, SPB a light scatter plate, MFR an intermediate frame, BL a cold cathode fluorescent lamp as a light source of the backlight, BLS a backlight support body, and LCA a lower case. These components are stacked together in the vertical order shown to form the liquid crystal display module MDL.

The whole of the liquid crystal display module MDL is fixed by claws and hooks provided on the shield case SHD.

The intermediate frame MFR is so shaped as to form an opening that corresponds to the display window LCW. The frame is provided with dents and bulges that match the shapes and thicknesses of the light scatter plate SPB, backlight support body BLS and various other circuit components, and also with heat dissipating openings.

The lower case LCA also serves as a reflector for light emitted from the backlight and is formed with reflection ridges for the fluorescent lamps BL to assure efficient reflection.

In this embodiment, the prism sheet 1 is installed between the liquid crystal display panel PNL and the light scatter plate SPB.

<<Outline of Matrix Section>>

Figure 7:
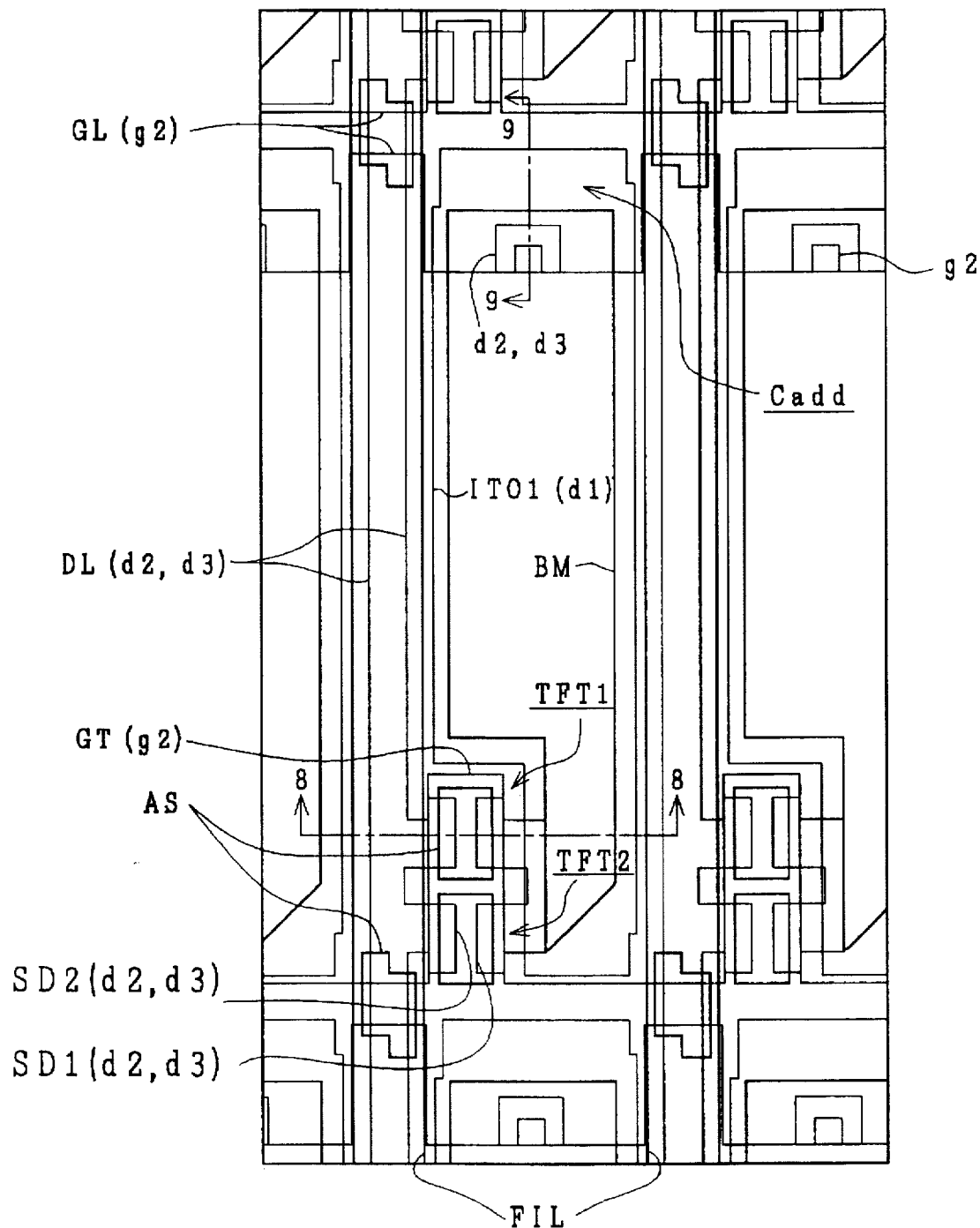
FIG. 7 is a plan view of essential portion showing one pixel and its periphery on the liquid crystal display section of a color liquid crystal display device of active matrix type that applies the present invention.
Figure 8:
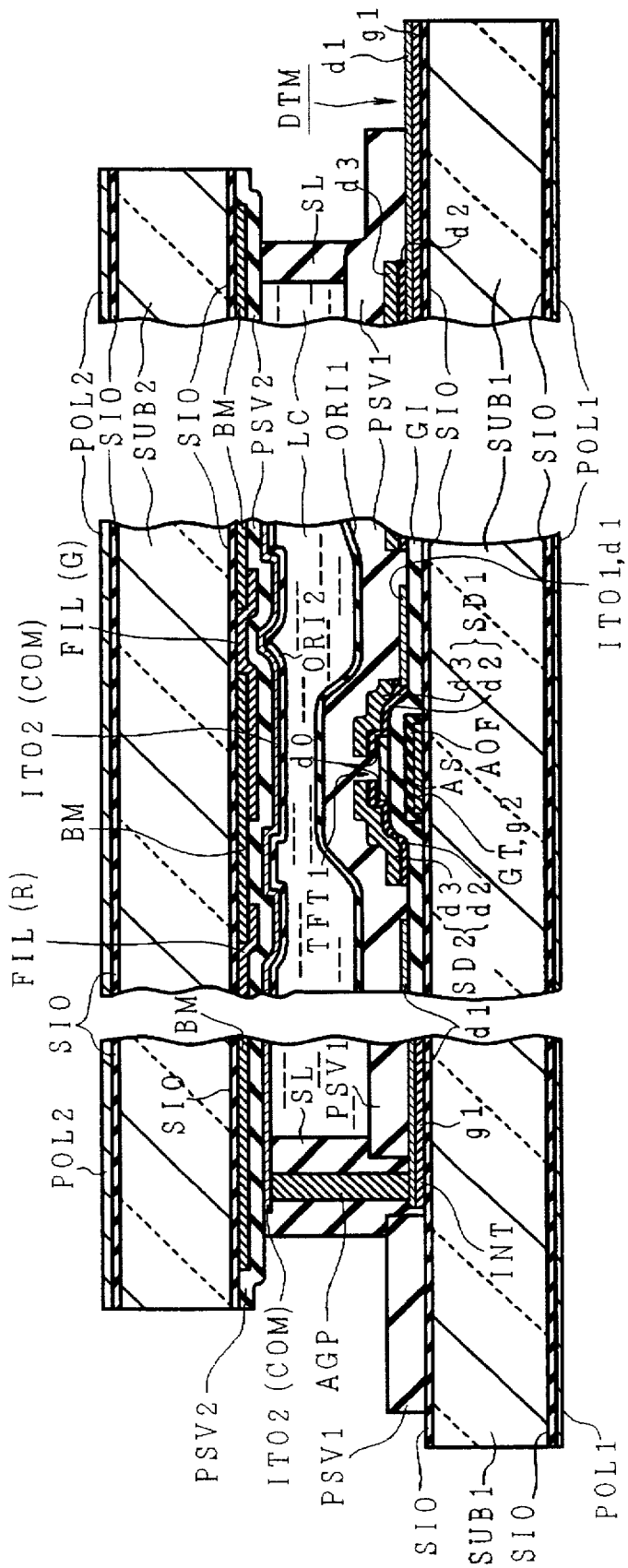
FIG. 8 is a cross section showing a pixel portion of matrix at center (b) and panel corners and video signal terminals at both sides (a) and (c)
Figure 9:
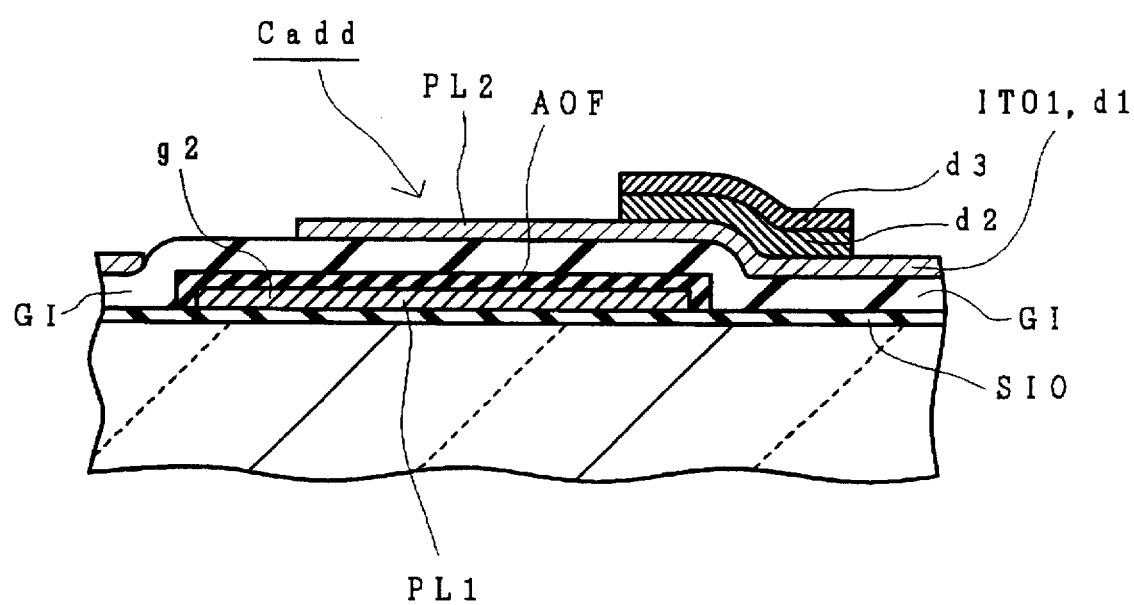
FIG. 9 is a cross section of added capacitance Cadd taken along the line 9—9 of FIG. 7.

FIG. 7 is a plan view showing one pixel and its periphery in the color liquid crystal display device of active matrix type that applies this invention. FIG. 8 (b) is a cross section taken along the line 8—8 of FIG. 7, with the pixel portion of matrix shown at the center and, FIG. 8 (a) and FIG. 8(c), the panel corner portion and video signal terminal respectively. FIG. 9 is a cross section taken along the line 9—9 of FIG. 7.

As shown in FIG. 7, each pixel is located within an intersection region (an area enclosed by four signal lines) between two adjacent scan signal lines (gate signal lines or horizontal signal lines) GL and two adjacent video signal lines (drain signal lines or vertical signal lines) DL. Each of the pixels includes a thin-film transistor TFT, a transparent pixel electrode ITO1 and an added capacitance Cadd. The scan signal lines GL extend laterally in the figure and arranged in the vertical direction. The video signal lines DL extend vertically and arranged in the horizontal direction.

As shown in FIG. 8, on a lower transparent glass substrate SUB1, which is below the liquid crystal layer LC, are formed the thin-film transistor TFT and the transparent pixel electrode ITO1. On an upper transparent glass substrate SUB2, which is above the liquid crystal layer LC, are formed a color filter FIL and a light shielding black matrix pattern BM. The transparent glass substrates SUB1, SUB2 are formed on both sides with silicon oxide films SIO made by dipping.

On the inner surface (liquid crystal LC side) of the upper transparent glass substrate SUB2 are deposited the light shielding film BM, color filter FIL, protective film PSV2, common transparent pixel electrode ITO2(COM) and upper orientation film ORI2, in that order.

<<Outline of Matrix and Its Periphery>>

Figure 10:
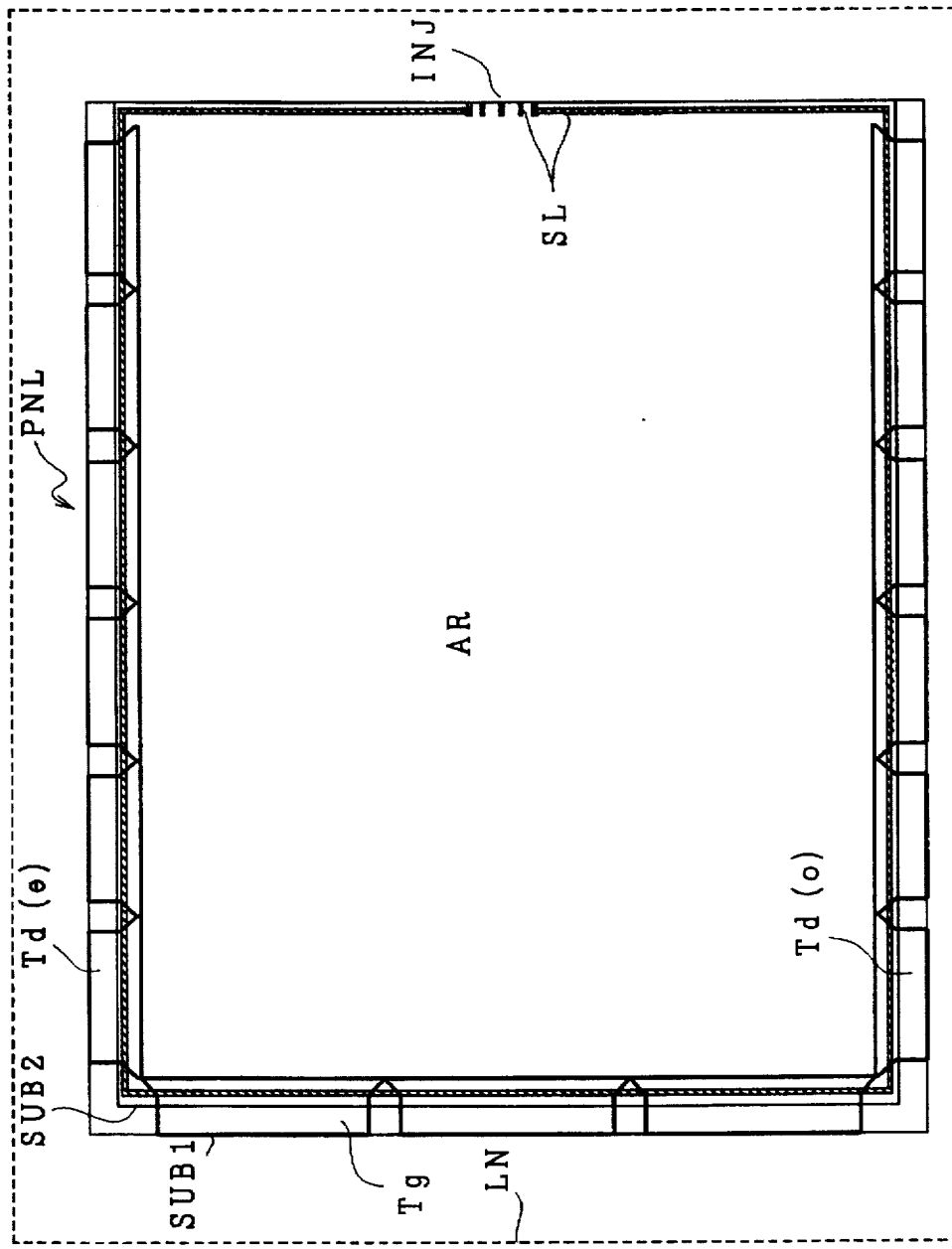
FIG. 10 is a plan view showing the configuration of the matrix peripheral section of the liquid crystal display panel.
Figure 11:
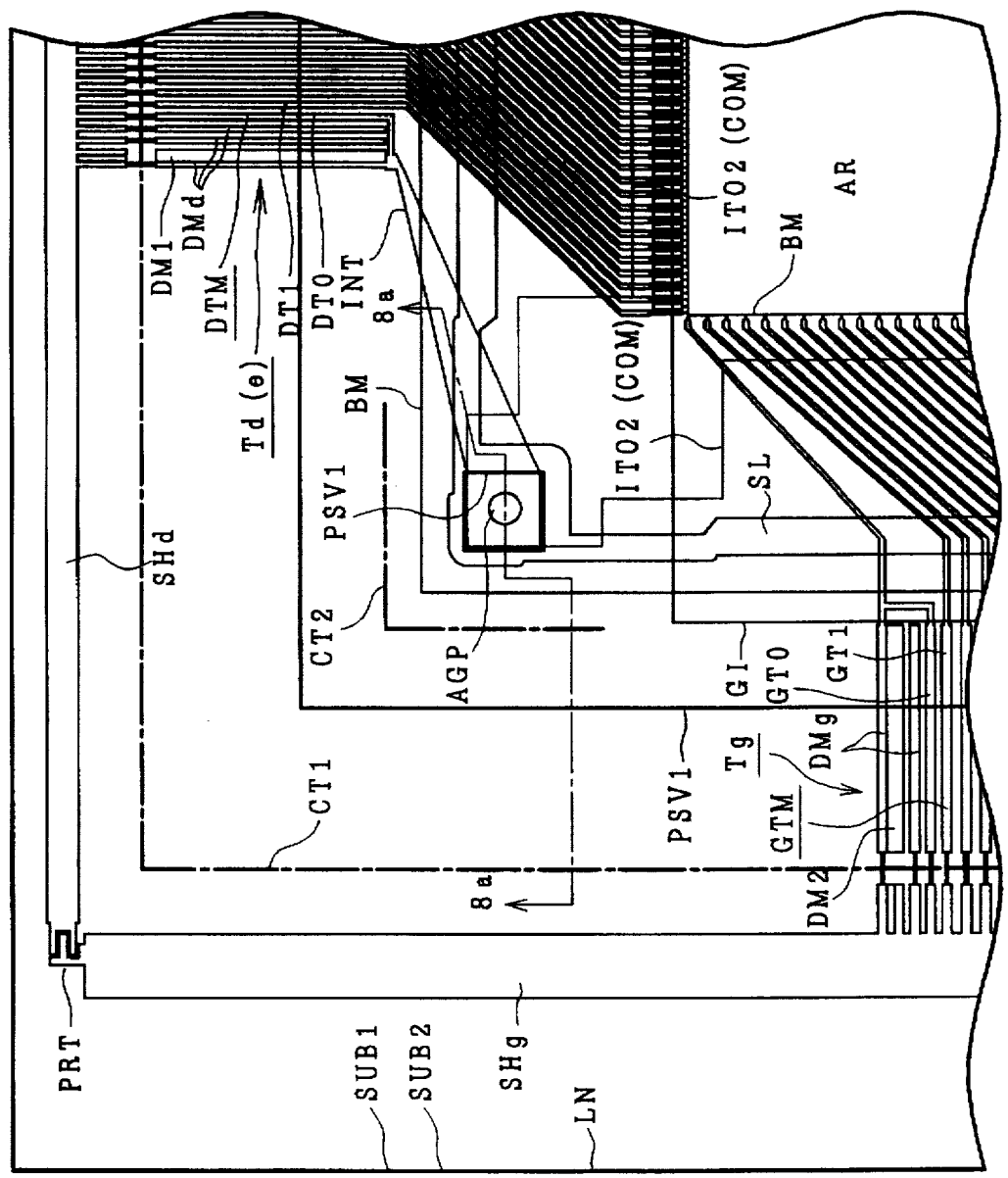
FIG. 11 is an enlarged plan view of the corner of the liquid crystal display panel including electric connections of upper and lower substrates.
Figure 12:
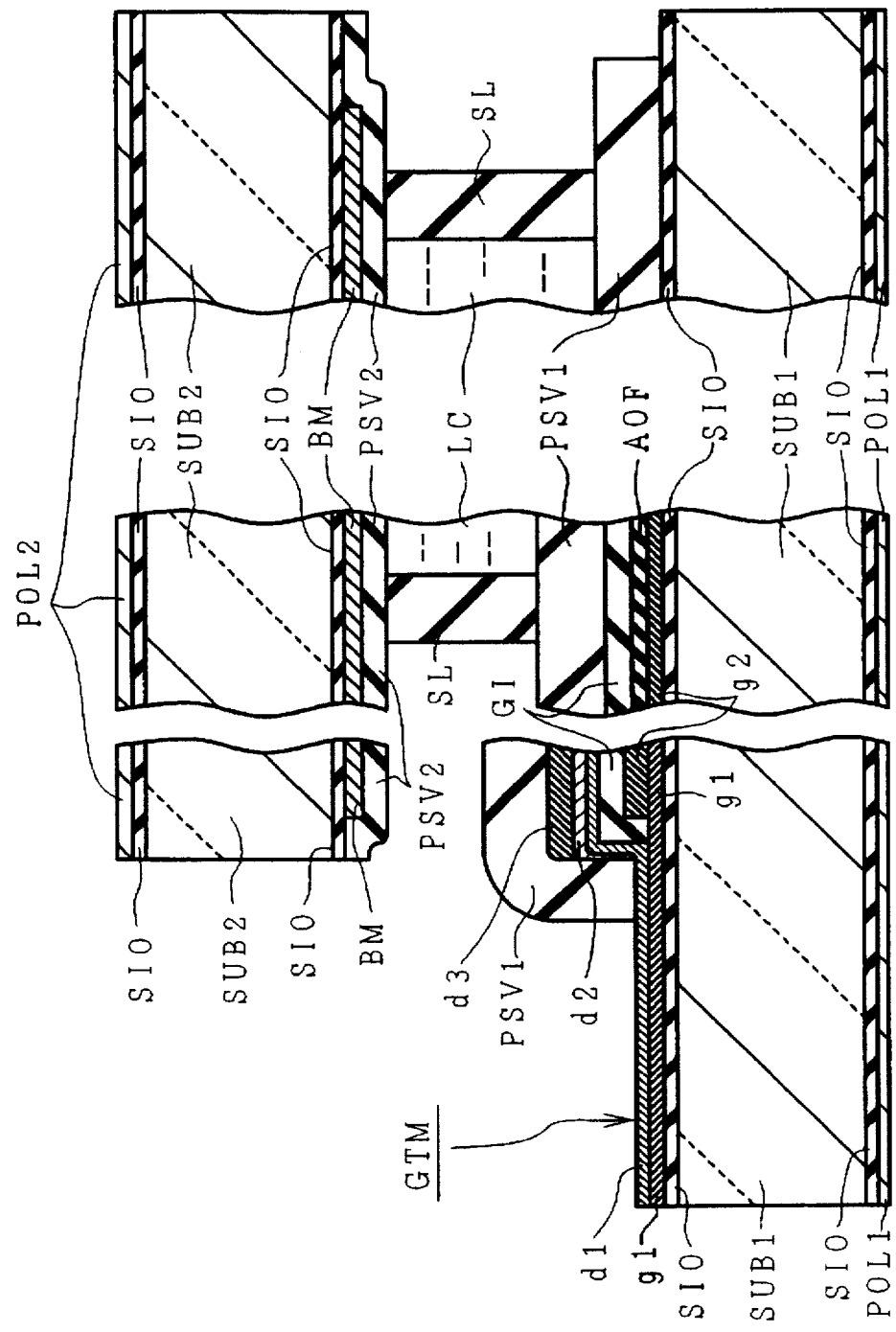
FIG. 12 is a cross section showing a scan signal terminal at the left and a panel edge portion without an external connection terminal at the right.

FIG. 10 shows a plan view of an essential portion of a periphery of the matrix (AR) of the liquid crystal display panel PNL including the upper and lower glass substrates SUB1, SUB2. FIG. 11 shows an enlarged plan view covering the seal portion SL corresponding to the panel left corner of FIG. 10. FIG. 12 (a) shows a cross section of an external connection terminal GTM to be connected to the scan circuit and, FIG. 12 (b), a cross section of a seal portion without an external connection terminal.

In the manufacture of this panel, if it is small in size, a plurality of devices are fabricated simultaneously on one glass substrate before being cut to improve throughput. If the display panel is large, a standard size glass substrate is processed for shared utilization of manufacturing facility and is then reduced in size according to a specific kind of product. In either case, the glass substrate is cut after it is subjected to a series of predetermined processes. FIGS. 10 and 11 show an example of latter case. FIG. 10 represents the upper and lower substrates SUB1, SUB2 after being cut and FIG. 11 represents the state before cutting. LN denotes an edge of the two substrates before cutting and CT1 and CT2 indicate positions at which the substrates SUB1, SUB2 are to be cut. In either case, at portions where the external connection terminal groups Tg, Td (subscripts are omitted) exist (at upper and lower sides and left side in the figure), the upper substrate SUB2 is limited in size to the inside of the lower substrate SUB1 so that these terminals are exposed in the completed state. The terminal groups Tg, Td each include scan circuit connection terminals GTM, video signal circuit connection terminals DTM and their associated lead-out wiring portions, and are given respective designations for each tape carrier package on which an IC chip is mounted. The leadout wires from the matrix section to the external connection terminal section for each group are inclined as they approach the ends. This is to make the terminals DTM, GTM of the liquid crystal display panel PNL compatible with the arrangement pitch of the packages and the connection terminal pitch in each package TCP.

Between, and along the edge of, the transparent glass substrates SUB1, SUB2 a seal pattern SL is formed, except at the liquid crystal sealing inlet INJ, to seal the liquid crystal. The sealing material may be, for instance, an epoxy resin. The common transparent pixel electrode ITO2 on the upper transparent glass substrate SUB2 is connected at least at one location, in this embodiment at four corners of the panel, to the leadout wires INT formed on the lower transparent glass substrate SUB1 by silver paste AGP. The leadout wires INT are formed in the same manufacture process as the gate terminals GTM and the drain terminals DTM described later.

The orientation films ORI1, ORI2, transparent pixel electrode ITO1 and common transparent pixel electrode ITO2 are formed inside the seal pattern SL. The polarizing plates POL1, POL2 are formed on the outer surfaces of the lower transparent glass substrate SUB1 and the upper transparent glass substrate SUB2, respectively. The liquid crystal LC is sealed in an area sealed by the seal pattern SL between the lower orientation film ORI1 and the upper orientation film ORI2, these films setting the orientation of the liquid crystal molecules. The lower orientation film ORI1 is formed over the protective film PSV1 on the lower transparent glass substrate SUB1.

This liquid crystal display device is assembled in the following manner. Various layers are deposited on the lower transparent glass substrate SUB1 and on the upper transparent glass substrate SUB2, separately. The seal pattern SL is formed on the upper transparent glass substrate SUB2, and then the lower and upper transparent substrates SUB1 and SUB2 are stacked together. The liquid crystal LC is injected from the opening INJ of the seal pattern SL and the opening INJ is closed with epoxy resin. Then, the upper and lower substrates are cut.

<<Thin-Film Transistor TFT>>

Next, returning to FIG. 7, the construction on the side of the TFT substrate SUB1 is described in detail.

When the thin-film transistor TFT is applied a positive bias at its gate electrode GT, the channel resistance between the source and the drain becomes small. When the bias is set to zero, the channel resistance increases.

Each pixel is provided redundantly with a plurality (two) of thin-film transistors TFT1, TFT2. The thin-film transistors TFT1, TFT2 are formed in virtually the same size (same channel length and width) and comprise a gate electrode GT, a gate insulating film GI, an i-type semiconductor layer AS formed of an i-type (intrinsic type: not doped with a conductivity type determining impurity) amorphous silicon, and a pair of source electrode SD1 and drain electrode SD2. The source and drain are determined by the polarity of the bias applied between them and because in this liquid crystal display device the bias polarity reverses during operation, it is understood that the source and drain switch during operation. In the following description, however, one of electrodes is fixedly represented as a source and the other as a drain for simplicity.

<<Gate Electrode GT>>

The gate electrode GT is formed such that it protrudes perpendicularly from the scan signal line GL (branching like a letter T). The gate electrodes GT projects beyond the active regions of the thin-film transistors TFT1, TFT2. The gate electrodes GT of the thin-film transistors TFT1, TFT2 are formed integrally (as a common gate electrode) and also formed integral with the scan signal line GL. In this example, the gate electrodes GT are formed of a second conductive film g2 of a single layer. The second conductive film g2 may, for example, use an aluminum film formed by sputtering, on which an aluminum anode oxide film AOF is provided.

This gate electrode GT is formed slightly larger than the i-type semiconductor layer AS so that it can completely cover the i-type semiconductor layer AS (when viewed from below) to protect the i-type semiconductor layer AS against external light or light from backlight.

<<Scan Signal Line GL>>

The scan signal lines GL are formed of a second conductive film g2. The second conductive film g2 of the scan signal lines GL is formed in the same manufacture process as the second conductive film g2 of the gate electrode GT and is formed integral with it. The aluminum anode oxide film AOF is also provided on the scan signal lines GL.

<<Insulating Film GI>>

The insulating film GI in the thin-film transistors TFT1, TFT2 is used along with the gate electrode GT as a gate insulating film to apply an electric field to the i-type semiconductor layer AS. The gate insulating film GI is formed over the gate electrode GT and the scan signal lines GL. The gate insulating film GI may use a silicon nitride film formed by plasma CVD to a thickness of 1200–2700 Å (in this embodiment about 2000 Å). The gate insulating film GI, as shown in FIG. 11, encloses the entire matrix section AR, with the periphery removed to expose the outer connection terminals DTM, GTM. The insulating film GI makes for electric isolation between the scan signal lines GL and the video signal lines DL.

<<i-Type Semiconductor Layer AS>>

The i-type semiconductor layer AS in this example is formed as an isolated island in each of the thin-film transistors TFT1, TFT2 and is made from amorphous silicon formed to a thickness of 200–2200 Å (in this embodiment about 2000 Å). A layer d0 is an N(+) type amorphous silicon semiconductor layer doped with phosphorous for ohmic contact. This layer d0 remains where there is the i-type semiconductor layer AS below and a conductive layer d2 (d3) above.

The i-type semiconductor layer AS is also provided at intersections (crossover portions) of the scan signal lines GL and the video signal lines DL between these lines. The i-type semiconductor layer AS at the intersections reduces the possibility of short-circuit between the scan signal lines GL and the video signal lines DL.

<<Transparent Pixel Electrode ITO1>>

The transparent pixel electrode ITO1 forms one of the pixel electrodes in the liquid crystal display section.

The transparent pixel electrode ITO1 is connected to both the source electrode SD1 of the thin-film transistor TFT1 and the source electrode SD1 of the thin-film transistor TFT2. Hence, in the event of a failure of one of the thin-film transistors TFT1, TFT2, if the failure is considered to cause a bad effect, an appropriate location is cut by a laser light.

If the failure does not cause any trouble, it is left as is because the other thin-film transistor is functioning properly. The transparent pixel electrode ITO1 is formed of the first conductive film d1, which is made from a transparent conductive film (indium-tin-oxide ITO: nesa film) deposited by sputtering to a thickness of 1000–2000 Å (in this embodiment 1400 Å).

<<Source Electrode SD1, Drain Electrode SD2>>

The source electrode SD1 and the drain electrode SD2 are formed of a second conductive film d2 in contact with the N(+) type semiconductor layer d0 and of a third conductive layer d3 formed thereover, respectively.

The second conductive film d2 is formed of a chromium film sputtered to a thickness of 500–1000 Å (in this embodiment about 600 Å). The chromium film increases its stress when formed in great thicknesses and thus has a thickness not exceeding about 2000 Å. The chromium film is intended to improve adherence with the N(+) type semiconductor layer d0 and to prevent diffusion of the third conductive film d3 into the N(+) type semiconductor film d0 (i.e., as a barrier layer). The second conductive film d2 may use, in addition to the chromium film, high-melting point metal (Mo, Ti, Ta, W) films and high-melting point metal silicides ($MoSi_2$, $TiSi_2$, $TaSi_2$, $WSi_2$).

The third conductive film d3 is formed of aluminum by sputtering to a thickness of 3000–5000 Å (in this embodiment 4000 Å). The aluminum film has a smaller stress than the chromium film and thus can be formed to a greater thickness. It has a function of reducing resistance of the source electrode SD1, drain electrode SD2 and video signal line DL and of making more reliable the step coverage (the ability to ride over steps produced by gate electrode GT and i-type semiconductor layer AS).

The second conductive film d2 and the third conductive film d3 are patterned using the same mask, after which using the same mask or the second conductive film d2 and third conductive film d3 as a mask, the N(+) type semiconductor layer d0 is removed. That is, the N(+) type semiconductor layer d0 remaining on the i-type semiconductor layer AS is removed self-aligningly from other than the second conductive film d2 and third conductive film d3. At this time because the N(+) type semiconductor layer d0 is etched away to its full thickness, the i-type semiconductor layer AS too is slightly etched at its surface. The degree of surface etch can be controlled by the etching duration.

<<Video Signal Line DL>>

The video signal lines DL are formed of the second conductive film d2 and third conductive film d3 which are in the same layer as the source electrode SD1 and drain electrode SD2.

<<Protective Film PSV1>>

A protective film PSV1 is formed over the thin-film transistor TFT and the transparent pixel electrode ITO1. The protective film PSV1 is intended mainly to protect the thin-film transistor TFT from humidity and must have high levels of transparency and humidity resistance. The protective film PSV1 may, for example, be made from a silicon oxide film or silicon nitride film deposited by plasma CVD to a thickness of about 1 μm.

The protective film PSV1, as shown in FIG. 11, encloses the entire matrix section AR, with the peripheral portion removed to expose the external connection terminals DTM, GTM. Also removed is a portion that connects the common electrode COM on the upper substrate SUB2 to the leadout wire INT for external connection terminals on the lower substrate SUB1 by silver past AGP. As to the thickness of the protective film PSV1 and the gate insulating film GI, the former is made thick for protection effect and the latter thin considering the mutual conductance gm of transistor. Therefore, as shown in FIG. 11, the protective film PSV1 with high protection capability is formed larger than the gate insulating film GI to protect as wide an area at peripheral portion as possible.

<<Light Shielding Film BM>>

On the upper transparent glass substrate SUB2 side, there is provided a light insulating film BM that prevents external light or light from the backlight from entering the i-type semiconductor layer AS. The closed polygonal contour line of the light shielding film BM shown in FIG. 7 indicates an opening, inside of which the light shielding film BM is not formed. The light shielding film BM is made from an aluminum film or chromium film with good light-shielding capability. In this embodiment, the light shielding film BM is formed of a chromium film sputtered to a thickness of about 1300 Å.

Thus, the i-type semiconductor layer AS of the thin-film transistors TFT1, TFT2 is vertically sandwiched between the light shielding film BM and the gate electrode GT greater than the i-type semiconductor layer AS and is protected against natural external light or light from the backlight. The light shielding film BM is formed in a lattice shape around each pixel (as a so-called black matrix) that defines an effective display region of each pixel. Hence, with the light shielding film BM, the contour of each pixel is clearly defined, improving contrast. That is, the light shielding film BM has two functions: shielding the i-type semiconductor layer AS from light and improving contrast or definition by black matrix.

The edge portion on the base side, with respect to the rubbing direction, of the transparent pixel electrode ITO1 (lower right portion in FIG. 7) is also shielded by the light shielding film BM, so that if a domain is formed in this area, it remains hidden preventing degradation of display characteristic.

The light shielding film BM is also formed on the peripheral portion. The pattern of the light shielding film BM is continuous to the pattern of matrix section of FIG. 7 provided with a plurality of dot-like openings. The light shielding film BM along the peripheral portion, as shown in FIGS. 11 and 12, extends to the outside of the sealing section SL to prevent leaked or reflected light from the equipment such as personal computer from entering the matrix section. The light shielding film BM is set about 0.3–1.0 mm inwardly of the edge of the substrate SUB2 to avoid the cut region of the substrate SUB2.

<<Color Filter FIL>>

The color filter FIL is formed in red, green and blue stripes repeating themselves at locations facing the pixels. The color filter FIL is formed a slightly larger than necessary so as to cover the whole transparent pixel electrode ITO1. The light shielding film BM is formed inwardly of the peripheral edge of the transparent pixel electrode ITO1 so that it overlaps the edge portions of the color filter FIL and the transparent pixel electrode ITO1.

The color filter FIL can be formed in the following manner. On the surface of the upper transparent glass substrate SUB2 is formed a dye substrate such as acrylic resin, which is then removed by photolithography except where a red filter is to be formed. Then, the dye substrate is dyed with a red dye and fixed to form a red filter R. The similar process is carried out to form a green filter G and a blue filter B successively.

<<Protective Film PSV2>>

The protective film PSV2 is intended to prevent the dye of the color filter FIL from leaking into the liquid crystal LC. The protective film PSV2 may be formed of a transparent resin material such as acrylic resin and epoxy resin.

<<Common Transparent Pixel Electrode ITO2>>

The common transparent pixel electrode ITO2 faces the transparent pixel electrode ITO1 provided on the lower transparent glass substrate SUB1 for each pixel. The optical state of the liquid crystal LC changes in response to the potential difference (electric field) between the transparent pixel electrode ITO1 for each pixel and the common transparent pixel electrode ITO2. The common transparent pixel electrode ITO2 is applied a common voltage Vcom. In this embodiment, the common voltage Vcom is set at a median DC potential between a minimum level drive voltage Vdmin and a maximum level drive voltage Vdmax, both applied to the video signal lines DL. When it is desired to reduce the power supply voltage of the IC circuit used by the video signal drive circuit to about a half, an AC voltage may be applied. For the plan view of the common transparent pixel electrode ITO2, see FIG. 11.

<<Structure of Added Capacitance Cadd>>

The transparent pixel electrode ITO1 is formed at an end opposite to the other end connected to the thin-film transistor TFT in such a way as to overlap the adjacent scan signal line GL. This overlapping, as shown in FIG. 9, forms an added capacitance (electrostatic capacitance element) Cadd whose one electrode PL2 is provided by the transparent pixel electrode ITO1 and the other electrode PL1 by the adjacent scan signal line GL. The dielectric film of the added capacitance Cadd is formed by the insulating film GI used as the gate insulating film of the thin-film transistor TFT and by the anodic oxide film AOF.

The added capacitance Cadd is formed where the second conductive film g2 of the scan signal line GL expands its width. The second conductive film g2 at intersections with the video signal lines DL is narrowed to reduce the probability of short-circuit with the video signal lines DL.

If the transparent pixel electrode ITO1 is broken at a stepped portion of the electrode PL1 of the added capacitance Cadd, this is compensated for by island regions formed of the second conductive film d2 and third conductive film d3 to straddle the step.

<<Working of Added Capacitance Cadd>>

The added capacitance Cadd functions to mitigate the effect of a gate potential variation ΔVg for the median potential (pixel electrode potential) when the thin-film transistor TFT switches. This is expressed as follows.

$$\Delta V1c = \{Cgs/(Cgs+Cadd+Cpix)\} \times \Delta Vg$$

where Cgs is a parasitic capacitance formed between the gate electrode GT and the source electrode SD1 of the thin-film transistor TFT; Cpix is a capacitance formed between the transparent pixel electrode ITO1(PIX) and the common transparent pixel electrode ITO2(COM); and ΔV1c represents an amount of change in the pixel electrode potential caused by ΔVg. This amount of change ΔV1C produces a DC component applied to the liquid crystal LC but can be reduced by increasing the added capacitance Cadd. The added capacitance Cadd also works to elongate the discharge period, making it possible to accumulate the video information long after the thin-film transistor TFT has turned off. Reduction in the DC component applied to the liquid crystal LC not only improves the life of the liquid crystal LC but prevents the so-called burning, a phenomenon in which a previous image remains when the liquid crystal display screen is switched over.

As mentioned earlier, to the extent that the gate electrode GT is formed larger than required in order to completely cover the i-type semiconductor layer AS, the overlapping area with the source electrode SD1 and drain electrode SD2 increases. This in turn results in an increased parasitic capacitance Cgs and also in the median potential V1c becoming more susceptible to the effects of the gate (scan) signal Vg. This demerit, however, can be eliminated by providing the added capacitance Cadd.

From the writing characteristic, the added capacitance Cadd is set to 4–8 times the liquid crystal capacitance (Cpix) (4·Cpix<Cadd<8·Cpix) and to 8–32 times the parasitic capacitance Cgs (8·Cgs<Cadd<32·Cgs).

The first stage scan signal line GL(Y0) used only as the added capacitance electrode wire is set at the same potential as the common transparent pixel electrode ITO2(Vcom). In the example of FIG. 11, the first stage scan signal line is short-circuited to the common electrode COM via terminal GT0, leadout wire INT, terminal DT0 and external wiring. Alternatively, the first stage added capacitance electrode wire Y0 may be connected to the final stage scan signal line Yend, or to a DC potential point other than Vcom (AC grounding point), or may receive one extra scan pulse Y0 from the vertical scan circuit.

A liquid crystal display module MDL compactly incorporates the liquid crystal display element PNL, a drive circuit to drive the liquid crystal display element PNL, and a light source.

Next, another embodiment in which the present invention is applied to the color liquid crystal display device of simple matrix type will be explained.

Figure 13:
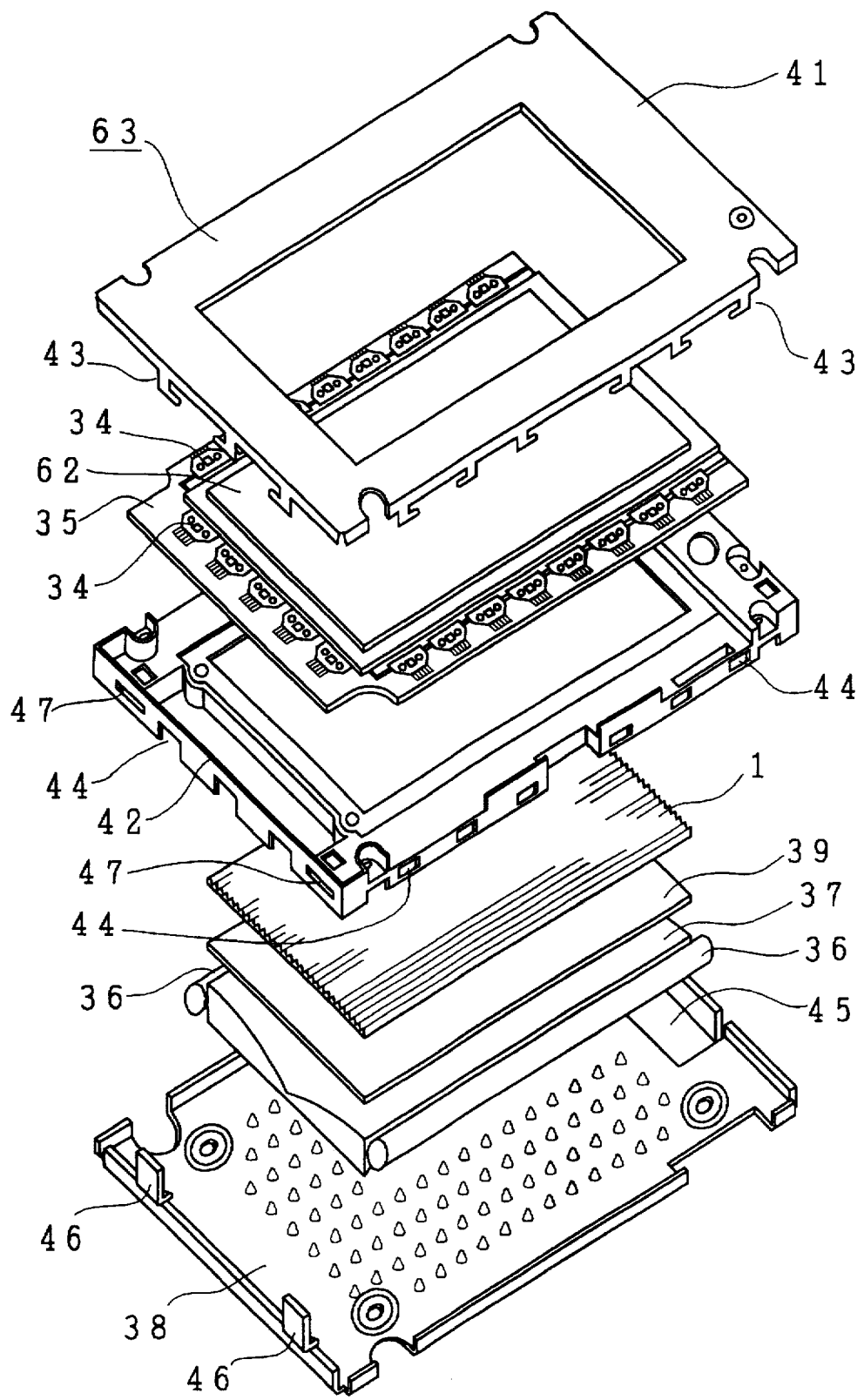
FIG. 13 is an exploded perspective view of the liquid crystal display module of a simple matrix type applying this invention.
Figure 14:
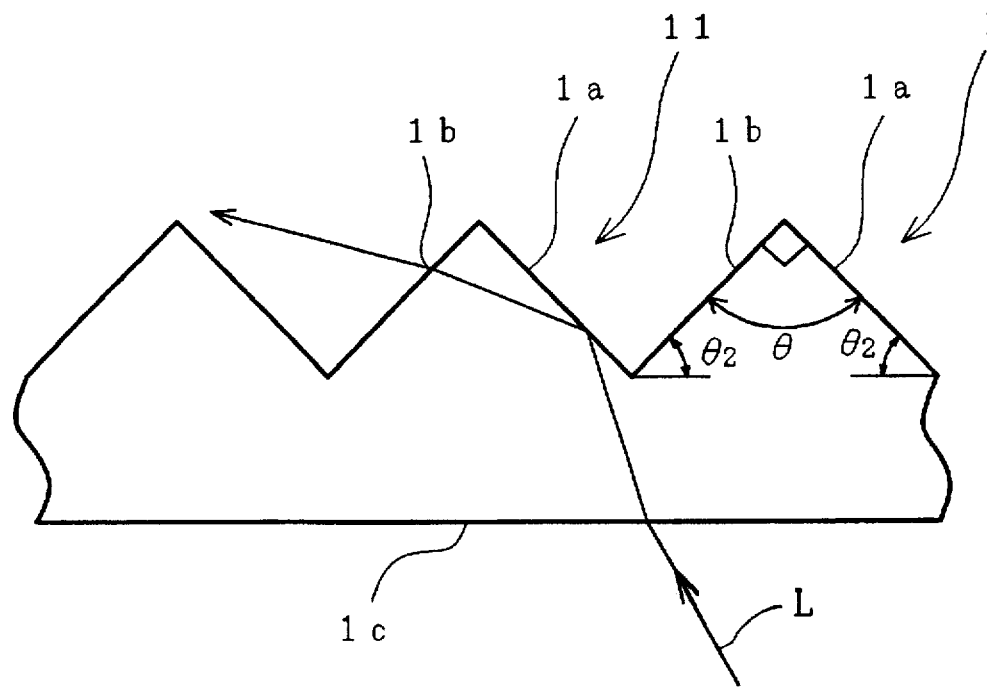
FIG. 14 is an enlarged cross section of a conventional prism sheet.
Figure 15:
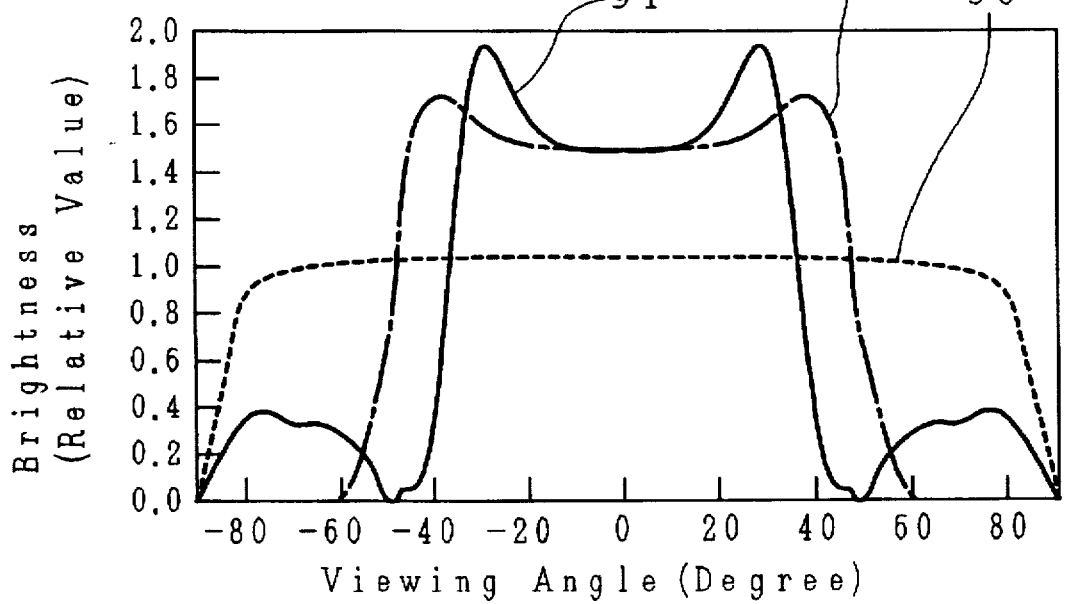
FIG. 15 is a graph showing the viewing angle characteristic of the intensity of light emitted from a conventional backlight (relation between viewing angle and brightness).

FIG. 13 shows an exploded perspective view of a color liquid crystal display module of simple matrix type. The IC 34 for driving the liquid crystal display panel (liquid crystal display element) 62 is mounted on a frame-shaped printed circuit board 35 with a window at the center in which to fit the liquid crystal display panel 62. The printed circuit board 35 with the liquid crystal display panel 62 is fitted in a window portion in a plastic-molded frame body 42. On the frame body 42, a metal frame 41 is placed and its claws 43 are bent into notches 44 formed in the frame body 42 to secure the metal frame 41 to the frame body 42.

The cold cathode fluorescent lamps 36 arranged on the upper and lower ends of the liquid crystal display panel 62, the light conduction plate 37 of acrylic plate for uniformly radiating light from the cold cathode fluorescent lamps 36 over the liquid crystal display cell 62, the reflection plate 38 consisting of a metal plate coated with white coating, and the milk-white scatter plate 39 for scattering light from the light conduction plate 37 are fitted into the window of the frame body 42 from behind in the order shown in FIG. 13. An inverter power supply circuit (not shown) for lighting the cold cathode fluorescent lamps 36 is installed in a recess (not shown; located at a position facing a recess 45 in the reflection plate 38) provided at the right on the back of the frame body 42. The scatter plate 39, light conduction plate 37, cold cathode fluorescent lamps 36 and reflection plate 38 are fixed by bending inwardly tongue pieces 46 of the reflection plate 38 into openings 47 of the frame body 42.

In this embodiment, too, a prism sheet 1, whose upper surface is a prism surface and lower surface is a smooth surface, is installed between the liquid crystal display panel 62 and the scatter plate 39 of the backlight to control the direction of light emitted from the backlight to a specified range of angle. The cross section of the prism surface of the prism sheet 1 is scalene triangles. The scalene triangle is so shaped that if the base angles of the scalene triangle are taken to be $\theta1$ and $\theta2$, the relation of 25 degrees$\leq\theta1<45$ degrees and 45 degrees$\leq\theta2<90$ degrees holds and that the prism surface on the base angle $\theta1$ side faces in the direction of a wider viewing angle characteristic of the liquid crystal display panel. Hence, because the emitted light can be converged in the optimum range of viewing angle of the liquid crystal display panel, it is possible to increase the brightness level of the optimum viewing angle range with the same power consumption as used in the conventional apparatus and to reduce the power consumption of the backlight.

The present invention has been described in detail in connection with the above embodiments. It is noted, however, that this invention is not limited to these embodiments but that various modifications may be made without departing from the spirit of the invention.

As mentioned above, since the emitted light can be converged in the optimum range of viewing angle of the liquid crystal display panel, it is possible to increase the brightness level of the backlight with the same lower consumption as used in the conventional apparatus and to reduce the power consumption of the backlight. This invention therefore can provide a liquid crystal display device, which is small in size, light in weight, consumes only a small power, and is suited for portable information display apparatuses.

I claim:

1. A liquid crystal display device comprising:
    an optical means arranged between a liquid crystal display panel and a backlight to control the direction of light emitted from the backlight to a specified range of angles;
    wherein the optical means is a prism sheet whose upper surface forms a prism surface and whose lower surface forms a smooth surface;
    wherein a cross section of the prism surface is a scalene triangles, each of which is so shaped that a center angle of the specified range of angles is shifted from a center angle of the backlight intensity range more than 50% of the peak intensity to a direction of the prism surface on a side adjacent a smaller side base angle, and the specified range of angles has a narrower viewing angle range than the backlight intensity range; and
    wherein minimum and maximum angles of the backlight intensity range at more than 50% of the peak intensity are negative and positive angles of incidence to the optical means, respectively, and the prism surface on the side adjacent the smaller base angle faces in a direction of a wider viewing angle characteristic of the liquid crystal display panel.

2. The liquid crystal display device according to claim 1, wherein minimum and maximum angles of the specified range of angles are smaller than about −20 degrees and greater than about 40 degrees, respectively.

3. The liquid crystal display device according to claim 1, wherein the backlight includes a light source and a light guide plate, and a scatter plate is which located at a surface of the light guide plate.

4. The liquid crystal display device according to claim 3, wherein the minimum and maximum angles of the backlight intensity range are smaller than about −80 degrees and greater than about 80 degrees, respectively.

5. The liquid crystal display device according to claim 1, wherein the optical means is formed of a material with a refraction index of 1.5 to 1.6; and
    wherein a cross section of the prism surface is scalene triangles, each of which is so shaped that, if base angles of the scalene triangles are taken to be $\theta1$ and $\theta2$, relations of 25 degrees$\leq\theta1<45$ degrees and 45 degrees$\leq\theta2<90$ degrees hold and that the prism surface on a side adjacent the base angle $\theta1$ faces in a direction of a wider viewing angle characteristic of the liquid crystal display panel.

6. The liquid crystal display device according to claim 5, wherein minimum and maximum angles of the specified range of angles are smaller than about −20 degrees and greater than 40 degrees, respectively; and
    wherein the minimum and maximum angles of the backlight intensity range are smaller than about −80 degrees and greater than 80 degrees, respectively.

7. The liquid crystal display device according to claim 1, wherein the optical means is formed of polycarbonate; and
    wherein a cross section of the prism surface is scalene triangles, each of which is so shaped that, if base angles of the scalene triangles are taken to be $\theta1$ and $\theta2$, relations of 25 degrees$\leq\theta1<45$ degrees and 45 degrees$\leq\theta2<90$ degrees hold and that the prism surface on a side adjacent the base angle $\theta1$ faces in a direction of a wider viewing angle characteristic of the liquid crystal display panel.

8. The liquid crystal display device according to claim 7, wherein minimum and maximum angles of the specified range of angles are smaller than about −20 degrees and greater than 40 degrees, respectively; and
    wherein the minimum and maximum angles of the backlight intensity range are smaller than about −80 degrees and greater than 80 degrees, respectively.

9. A liquid crystal display device comprising:
    an optical means arranged between a liquid crystal display panel and a backlight to control the direction of light emitted from the backlight to a specified range of angles;
    wherein the light from a scatter plate of the backlight provides a peak luminance in the normal direction to the liquid crystal display panel;
    wherein the optical means is a prism sheet whose upper surface forms a prism surface and whose lower surface forms a smooth surface and which is formed of a material with a refraction index of 1.5 to 1.6;
    wherein a cross section of the prism surface is scalene triangles, each of which is so shaped that, if base angles of the scalene triangle are taken to be $\theta1$ and $\theta2$, relations of 25 degrees$\leq\theta1<45$ degrees and 45 degrees$\leq\theta2<90$ degrees hold and that the prism surface on a side adjacent the base angle $\theta1$ faces in a direction of a wider viewing angle characteristic of the liquid crystal display panel.

10. The liquid crystal display device according to claim 9, wherein minimum and maximum angles of the specified range of angles are smaller than about −20 degrees and greater than about 40 degrees, respectively.

11. The liquid crystal display device according to claim 9, wherein the backlight includes a light source and a light guide plate, and the scatter plate is which located at a surface of the light guide plate.

12. The liquid crystal display device according to claim 11, wherein the minimum and maximum angles of the backlight intensity range are smaller than about −80 degrees and greater than about 80 degrees, respectively.

13. A liquid crystal display device comprising:

an optical means arranged between a liquid crystal display panel and a backlight to control the direction of light emitted from the backlight to a specified range of angles;

wherein the light from a scatter plate of the backlight provides a peak luminance in the normal direction to the liquid crystal display panel;

wherein the optical means is a prism sheet whose upper surface forms a prism surface and whose lower surface forms a smooth surface and which is formed of polycarbonate;

wherein a cross section of the prism surface is scalene triangles, each of which is so shaped that, if base angles of the scalene triangle are taken to be θ1 and θ2, relations of 25 degrees≦θ1<45 degrees and 45 degrees≦θ2<90 degrees hold and that the prism surface on a side adjacent the base angle θ1 faces in a direction of a wider viewing angle characteristic of the liquid crystal display panel.

14. The liquid crystal display device according to claim 13, wherein minimum and maximum angles of the specified range of angles are smaller than about −20 degrees and greater than about 40 degrees, respectively.

15. The liquid crystal display device according to claim 13, wherein the backlight includes a light source and a light guide plate, and the scatter plate is which located at a surface of the light guide plate.

16. The liquid crystal display device according to claim 15, wherein the minimum and maximum angles of the backlight intensity range are smaller than about −80 degrees and greater than about 80 degrees, respectively.

17. The liquid crystal display device according to claim 1, wherein the minimum and maximum angles of the backlight intensity range at more than 50% of the peak intensity are less than −40 degrees and +40 degrees of incidence to the optical means, respectively, and the average brightness of the specified range of angles is brighter than the average brightness of the backlight intensity range.

18. The liquid crystal display device according to claim 17, wherein minimum and maximum angles of the specified range of angles are smaller than about −20 degrees and greater than about 40 degrees, respectively.

19. The liquid crystal display device according to claim 17, wherein the backlight includes a light source and a light guide plate, and a scatter plate is which located at a surface of the light guide plate.

20. The liquid crystal display device according to claim 19, wherein the minimum and maximum angles of the backlight intensity range are smaller than about −80 degrees and greater than about 80 degrees, respectively.

\* \* \* \* \*